US009320202B2

(12) United States Patent
Houseman (10) Patent No.: US 9,320,202 B2
(45) Date of Patent: Apr. 26, 2016

(54) DEBRIS REMOVAL SYSTEM FOR A LAWN MOWER (71) Applicant: Jason Delane Houseman, Orchard Park, NY (US)

(72) Inventor: Jason Delane Houseman, Orchard Park, NY (US)

(*) Notice: Subject to any disclaimer, the term of this patent is extended or adjusted under 35 U.S.C. 154(b) by 156 days.

(21) Appl. No.: 14/349,607

(22) PCT Filed: Apr. 2, 2014

(86) PCT No.: PCT/US2014/032607
§ 371 (c)(1),
(2) Date: Apr. 3, 2014

(87) PCT Pub. No.: WO2014/165557
PCT Pub. Date: Oct. 9, 2014

(65) Prior Publication Data
US 2015/0296718 A1 Oct. 22, 2015

Related U.S. Application Data (60) Provisional application No. 61/808,173, filed on Apr. 3, 2013.

(51) Int. Cl.
*A01G 1/12* (2006.01)
*A01D 43/00* (2006.01)
*A01D 34/00* (2006.01)
*A01D 34/68* (2006.01)
*A01D 34/82* (2006.01)

(52) U.S. Cl.
CPC .............. *A01G 1/125* (2013.01); *A01D 34/001* (2013.01); *A01D 34/68* (2013.01); *A01D 34/82* (2013.01); *A01D 43/00* (2013.01)

(58) Field of Classification Search
CPC ... A01D 75/187; A01D 11/02; A01D 34/835; A01D 43/00; A01D 34/82; A01G 1/125
USPC ............ 56/400.15, 400.04, 400.11, 363, 362; 141/108, 109; 15/105, 142
See application file for complete search history.

(56) References Cited

U.S. PATENT DOCUMENTS

| 501,430 | A | | 7/1893 | Knight | |
| 2,023,697 | A | | 12/1935 | Reynolds | |
| 2,157,620 | A | * | 5/1939 | McGrath | A01D 34/001 56/249 |
| 2,256,255 | A | | 10/1939 | Bangert | |
| 2,304,873 | A | | 4/1941 | Bangert | |
| 2,465,543 | A | | 3/1949 | Mangan | |
| 2,544,505 | A | | 3/1951 | Kronhaus | |
| 2,981,428 | A | | 9/1953 | Noffsinger | |
| 2,751,741 | A | * | 6/1956 | Carson | A01D 57/01 56/249 |

(Continued)

*Primary Examiner* — John G Weiss
(74) *Attorney, Agent, or Firm* — Phillips Lytle LLP; David L. Principe (57) ABSTRACT A debris removal system (15) for mounting on a lawn mower (20) for removing debris from a lawn. The lawn mower has a first end (21), a second end (22) opposite the first end (21), and a mower deck (29). The debris removal system has a tool (53) pivotally mounted to the mower deck (29). The tool (53) has a proximal end (54) and a distal end (55). The tool (53) is capable of being moved from a first position with the distal end (54) extending forward from the first end (21) of the mower (20) into contact with the lawn to a second position where the distal end (21) of the tool (53) is positioned above and out of contact with the lawn. A receptacle (47) is disposed on the mower (20) and configured to receive the debris from the tool (53) when the tool (53) is moved from the first position to the second position.

19 Claims, 8 Drawing Sheets

(56) References Cited

U.S. PATENT DOCUMENTS

| | | | |
|---|---|---|---|
| 2,794,309 A | 6/1957 | Tabac | |
| 2,942,396 A | 10/1957 | Farnam | |
| 2,972,849 A | 2/1961 | Ridenour et al. | |
| 3,430,421 A | 3/1969 | Matthews | |
| 3,447,179 A * | 6/1969 | Copeland | E01H 1/047 15/81 |
| 3,562,845 A * | 2/1971 | Hayden | E01H 1/106 15/347 |
| 3,693,333 A * | 9/1972 | Bishop | A01D 43/02 56/16.1 |
| 4,019,768 A | 4/1977 | Niece | |
| 4,372,064 A | 2/1983 | Benenate et al. | |
| 4,765,666 A | 8/1988 | Parks | |
| 4,966,400 A | 10/1990 | Hull et al. | |
| 5,018,239 A | 5/1991 | Dobric | |
| 5,101,617 A | 4/1992 | Hare et al. | |
| 5,325,657 A | 7/1994 | Bevis | |
| 5,685,134 A * | 11/1997 | Thornburg | A01D 43/00 56/12.9 |
| 5,826,417 A | 10/1998 | Evans | |
| 6,094,896 A | 8/2000 | Lane | |
| 6,122,904 A | 9/2000 | Garcia de Alba | |
| 6,308,505 B1 | 10/2001 | Beckett | |
| 6,600,981 B2 | 7/2003 | Ruffner | |
| 7,617,666 B1 * | 11/2009 | Marchese | A01D 7/00 56/400.04 |
| 7,837,751 B2 | 11/2010 | Dunning et al. | |
| 7,909,377 B2 | 3/2011 | Hopp | |
| 8,220,240 B2 | 7/2012 | Tielburger | |
| 2002/0144495 A1 | 10/2002 | Sugiyama et al. | |
| 2006/0236670 A1 * | 10/2006 | Glasford | A01D 43/02 56/257 |
| 2010/0132229 A1 | 6/2010 | Chahino | |
| 2012/0193273 A1 * | 8/2012 | Chrostowski | A01D 7/08 209/419 |
| 2013/0125522 A1 | 5/2013 | Williams | |

* cited by examiner

DEBRIS REMOVAL SYSTEM FOR A LAWN MOWER

CROSS-REFERENCE TO RELATED APPLICATION

The present application claims priority benefit of U.S. Provisional Patent Application No. 61/808,173 filed on Apr. 3, 2013, which is hereby incorporated by reference.

TECHNICAL FIELD

The present invention relates generally to the field of lawn and garden tools, and more particularly to a debris removal system for mounting on a lawn mower.

BACKGROUND ART

The removal of debris such as papers, solid pet waste, wrappers, etc. typically requires the mower to be turned off, the debris to be picked up manually, and the debris to be temporarily placed in an area not requiring maintenance. This area may be, for example, a driveway, a sidewalk, an area where the lawn has already been mowed, or a trash receptacle. This method of removing debris is usually considered to be the safest way to remove debris while using a power lawn mower as it is unsafe to place hands/feet etc. near spinning blades. Furthermore, if one were to attempt to remove the debris with the mower running, in most cases, one hand would have to remain on the mower handle to keep the safety shut-off lever depressed while the other hand reaches for the debris. This practice poses additional safety hazards, as stretching with one hand while holding the mower handle with the other hand is an unstable position, especially when reaching near the spinning blades of the mower deck. Another option for the user is to run the lawn mower over the debris. The debris is consequently either shredded and scattered around the yard, requiring the user to perform post-mowing clean-up of the lawn, or the debris can be harmful to the mower blades and/or mower deck. In the case of debris such as a small rock, stone or beverage container, the debris can be harmful to the lawn mower or can result in a projectile that may be dangerous to other individuals or pets that come within the path of the projectile.

BRIEF SUMMARY OF THE INVENTION

With parenthetical reference to the corresponding parts, portions or surfaces of the disclosed embodiment, merely for the purposes of illustration and not by way of limitation, the present invention provides a debris removal system (15) for mounting on a lawn mower (20) for removing debris from a lawn. The lawn mower has a first end (21), a second end (22) opposite the first end (21), and a mower deck (29). In one aspect of the invention, the debris removal system has a tool (53) pivotally mounted to the mower deck (29). The tool (53) has a proximal end (54) and a distal end (55). The tool (53) is capable of being moved from a first position with the distal end (54) extending forward from the first end (21) of the mower (20) into contact with the lawn to a second position where the distal end (21) of the tool (53) is positioned above and out of contact with the lawn. A receptacle (47) is disposed on the mower (20) and configured to receive debris from the tool (53) when the tool (53) is moved from the first position to the second position.

In other aspects, the tool (53) is mounted on the mower deck (29), is pivotally mounted on the mower (20) or is pivotally mounted on the mower deck (29).

In another aspect, the system (15) further comprises a first plate (50) mounted to the mower deck (29) and a second plate (57) pivotally attached to the first plate (50). The tool (53) may be adjustably mounted on the first plate (50). The tool may have a solid portion (56) and a plurality of curved tines (59) extending therefrom.

In another aspect, the receptacle (47) may be removably attached to the mower (20). The receptacle (47) may be formed from a wire grid.

In another aspect, the system may include a control wire (62) capable of remotely moving the tool (53) between the first and the second position. An actuator (70) for moving the control wire (62) to deploy the tool (53) may be mounted on a handle (32) attached to the second end (22) of the mower (20).

In another aspect, the debris removal system (15) may include a tool (53) pivotally mounted to the first end (21) of the mower (20). The tool (53) has a proximal end (54) and a distal end (55). The tool (53) is capable of being rotated between a first position with the distal end (54) extending forward from the first end (21) of the mower (20) into contact with the lawn and a second position where the distal end (54) of the tool (53) is positioned above and out of contact with the lawn. A receptacle (47) is disposed on the mower (20) and is configured to automatically receive the debris from the tool (53) when the tool (53) is rotated from the first position to the second position.

In another aspect, the debris removal system includes a tool (53) having a proximal end (54) and a distal end (55). The system may include means for moving the tool (53) between a first position with the distal end (54) extending forward from the first end (21) of the mower (20) into contact with the lawn to a second position where the distal end (54) of the tool (53) is positioned above and out of contact with the lawn. The system may also include means for collecting debris disposed on the tool (53) when the tool (53) is moved from the first position to the second position.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 1:
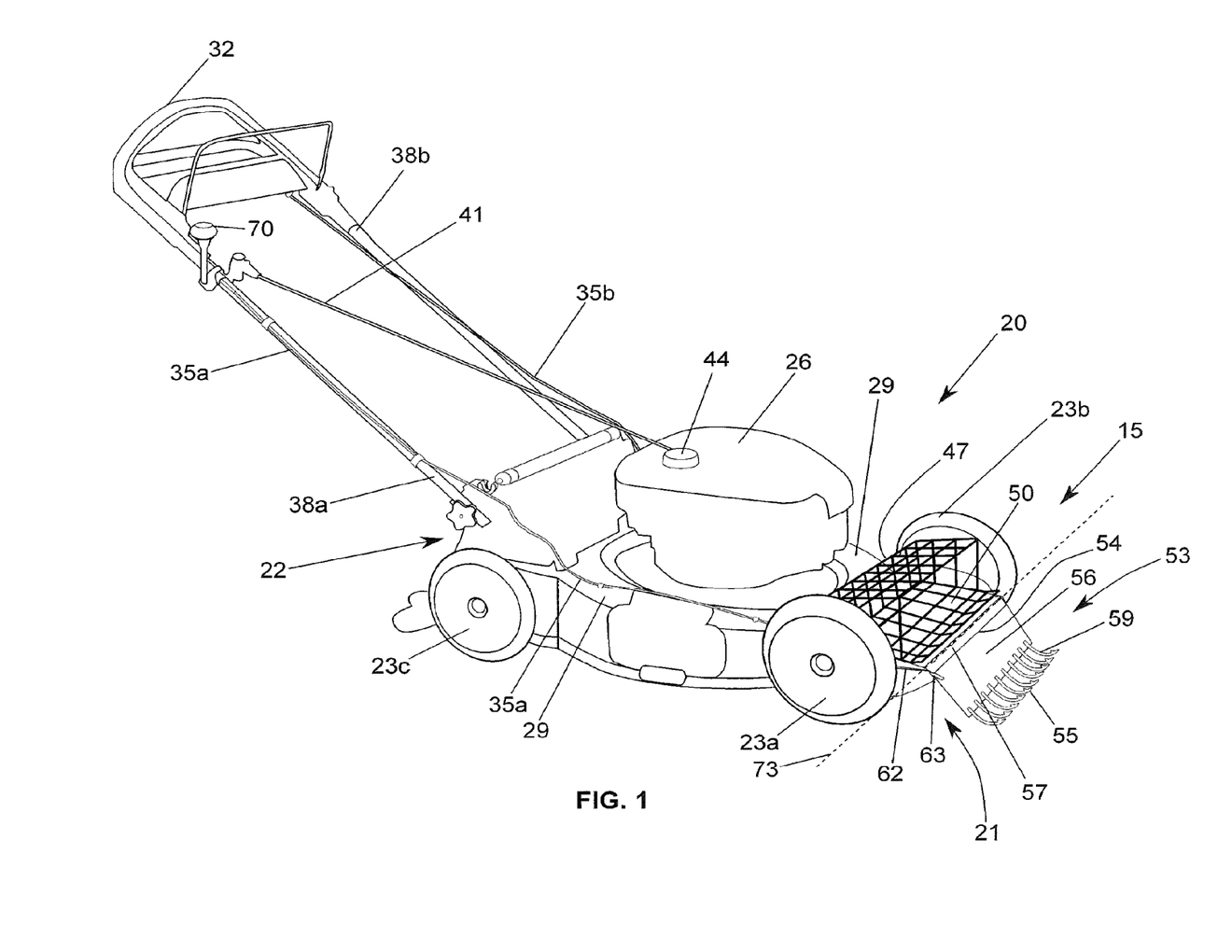
FIG. 1 is a perspective view of a walk behind lawn mower equipped with a first embodiment of the invention.

Referring now to the drawings, and more particularly to FIG. 1 thereof, one aspect of this invention provides a debris removal system 15 that may be provided as a component part of original lawn equipment or may be provided as an aftermarket attachment. A standard walk behind mower 20 is shown. The mower 20 has a first end 21 and a second end 22. The mower 20 may be self-propelled or may be a push mower as will be evident to those of ordinary skill in the art. The mower 20 is typically provided with a set of wheels 23a, 23b, 23c, and 23d (FIG. 8); and an engine 26 mounted on top of a mower deck 29. A rotating blade (not shown) is positioned underneath the mower deck 29. The mower 20 has a handle 32 attached to the back of the mower 20 by a pair of parallel arms 38a and 38b. A pull cord 41 is typically provided for starting the engine 26 which is usually gasoline powered. A cap 44 is provided at the top of the mower 20 to provide access for refilling a gas tank. The arms 38a, 38b may be used to provide support for control cables 35a, 35b extending to the mower deck 29.

A removable receptacle 47 may be supported above the mower deck 29 at the front of the mower 20 between the front wheels 23a, 23b. The receptacle 47 may be removably attached to a first plate 50 that is attached to the top surface of the mower deck 29. A tool 53 configured for scooping debris is positioned at the first end 21 of the mower 20. The tool 53 has a proximate end 54 and a distal end 55 and may take various shapes and sizes. For example, the tool 53 may be constructed with side walls or a back wall to prevent the debris from sliding off of the tool 53 during scooping or transfer. The tool 53 extends forward and downward from the first end 21 of the mower 20 such that it is capable of extending down into contact with the lawn to pick up debris from the lawn in front of the mower 20 when the mower 20 is in operation. In the embodiment shown, the tool 53 has a solid portion 56 extending to a set of curved tines 59. The tool 53 is capable of pivoting relative to the mower 20 such that it can pick up debris and deposit the debris into the receptacle 47 on top of the mower deck 29 as described herein. The tool 53 is capable of being pivoted upward and out of contact with the lawn during normal operation of the mower 20.

Figure 2:
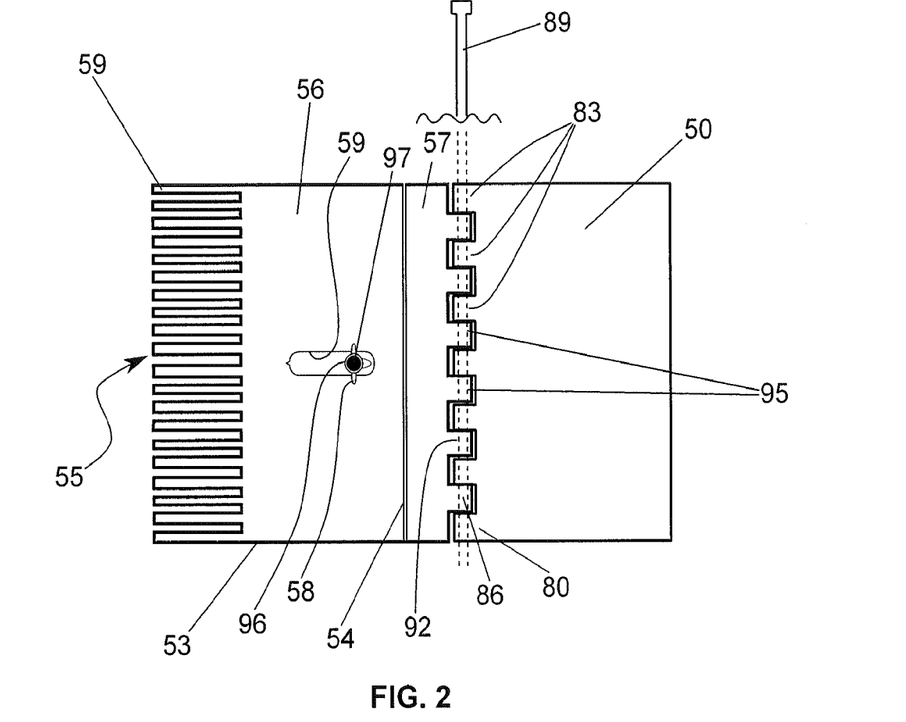
FIG. 2 is a top plan view of one embodiment of a subassembly of the present invention.

As best shown in FIG. 2, the tool 53 may be adjustably mounted to a second plate 57 that is pivotally attached to the first plate 50 as described in greater detail herein. The tool 53 can slide forward relative to plate 57 by means of a slot 59 and then it can be fixed in position by a fastener 58 such as a wing nut or the like. The pair of plates 50 and 57 are one example of a pivoting attachment for the tool 53. Other ways of pivotally mounting the tool 53 to the first end 21 of the mower 20 will be evident to those of ordinary skill in the art based on this disclosure.

Returning to FIG. 1, in order to move the tool 53 from an open position (shown in FIG. 1) to a closed position (best shown in FIGS. 10 and 12), the mower 20 may be provided with a control system 61. Control system 61 may take numerous forms and may include, mechanical, electrical including wired and wireless systems or other systems. One example of a mechanical system is shown. A control wire 62 for pushing and/or pulling plate 57 to cause the tool 53 to rotate about axis 73 is located inside cable 35a. Cable 35a may be mounted on the mower deck 29 and the arm 38a extending to the handle 32 of the mower 20. The control wire 62 may be connected to a corner 63 of plate 57. An actuator 70, which controls the position of the wire 62 inside the cable 35a, may be mounted on the handle 32 or the arm 38a. The actuator 70 is shown in the position where the plate 57 is pushed forward by the control wire 62 to deploy the tool 53 into the lawn to pick up debris in front of the mower 20. When the actuator 70 is retracted, the control wire 62 pulls the plate 57 such that it rotates counterclockwise with respect to the pivot axis 73. When the plate 57 rotates counterclockwise with respect to the pivot axis 73, the debris is lifted upward by the tool 53 and deposited into the receptacle 47 on the mower deck 29.

Figure 13:
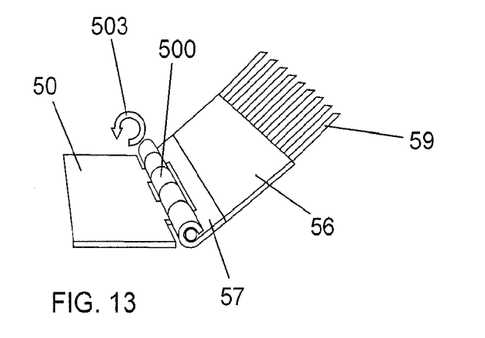
FIG. 13 is a perspective view of a first plate and a second plate connected by a hinge with a torsion spring mounted thereon.
Figure 14:
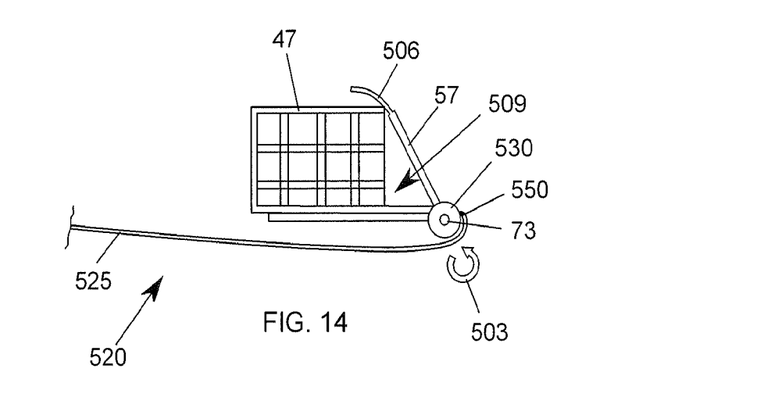
FIG. 14 is a schematic view of an alternate embodiment showing a control system for operating a loaded to close torsion spring mounted on the hinge.
Figure 15:
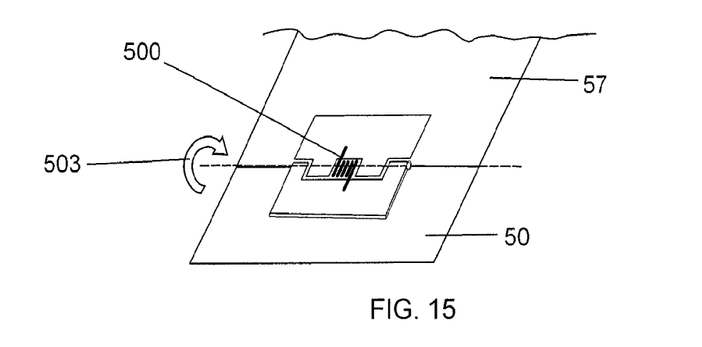
FIG. 15 is a bottom perspective view showing a loaded to close torsion spring mounted on a hinge.

Turning to FIGS. 13-15, the movement of the plate 57 may be assisted by a biasing member 500 such as a torsion spring. The biasing member 500 may bias the plate 57 in a normally open or normally closed (i.e., loaded to close) position as indicated by arrow 503. If a biasing member 500 is used, the control wire 62 may operate a simple latch to release the spring force to rotate the plate 57. It may also be possible that the weight of the tool 53 holds the tool 53 in the closed position once it is rotated beyond a certain point. In the closed position, the tool 53 rests against the portions 506 of the receptacle 47 around the opening 509 and prevents the debris from exiting from the receptacle 47. Once the mower 20 is stopped, the receptacle 47 can be removed from the mower deck 29 for disposal of the debris into an appropriate waste container or compost area.

In FIG. 14, one embodiment of a control system 520 is shown. A flexible cable 525 may be attached to a wheel 530 that rotates with plate 57 about axis 73 (normal to the page). The flexible cable 525 is attached at 550 and rotates the wheel 530 against the force of the spring 500 to pull the tool 53 downward toward the lawn. Another control system is discussed in connection with FIGS. 16-17 herein.

It is to be understood that although the tool 53 is shown mounted on a walk behind mower 20, the tool 53 can also be used with other types of lawn equipment such as riding lawn-mowers, small tractors, zero-turn lawn mowers, push reel mowers, or electric lawn mowers.

Returning to FIG. 2, the first plate 50 may be attached to the mower deck 29 between the front wheels 23a, 23b of the mower 20. A first end 80 of the first plate 50 may be provided with a set of knuckles 83 extending toward the front of the mower 20. The knuckles 83 have transverse openings 86 for receiving a hinge pin 89. The plate 57 has a set of knuckles 92 that extend toward the second end 22 of the mower 20 and have transverse openings 95 for receiving the hinge pin 89. The knuckles 83 on plate 50 are offset from the knuckles 92 on plate 57 such that they can be intercalated to form a hinge. The plate 57 may have an opening 96 defined therein for receiving a fastener 97. The tool 53 may be adjustably attached to the plate 57 such that the extension of the tool 53 from the front of the mower 20 may be adjusted depending on the height of the mower 20 above the lawn. Portion 56 of the tool 53 may be provided with an oblong slot 59. The slot 59 provides for adjustment of the portion 56 relative to plate 57. If portion 56 is moved to the left relative to the plate 57, the tool 53 will extend farther away from the mower 20. If portion 56 is moved to the right relative to the plate 57, then the tool 53 will extend a smaller distance from the mower 20. Once portion 56 is positioned relative to plate 57 a wing nut 58 may be attached to fastener 97 extending through the slot 59 and the opening 96 in plate 57 to fix the position of plate 56. If the wing nut 58 is loosened, the position of plate 56 relative to plate 57 can be adjusted.

Figure 3:
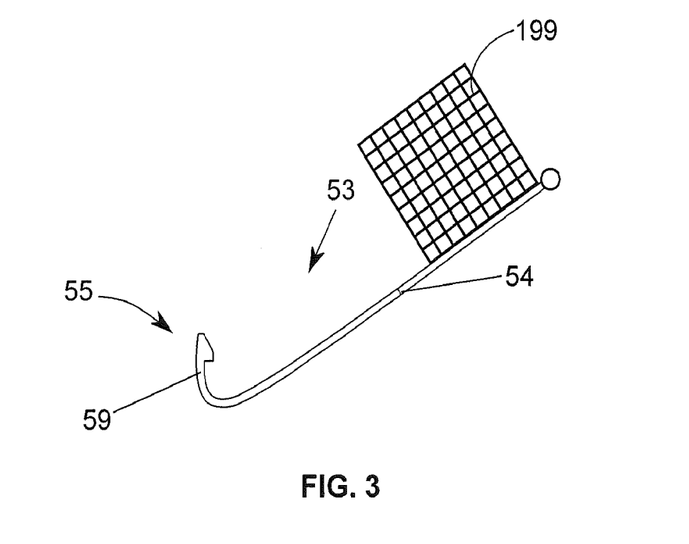
FIG. 3 is a side elevational view of one embodiment of the tool of the present invention.

Turning to FIG. 3, the tool 53 may have a proximal end 54 and a distal end 55. The distal end 55 may be curved about a radius. The distal end 55 may have a point at the end. The curvature at the distal end 55 of the tool 53 may provide a mechanical advantage for extending below and lifting debris from a lawn. An alternate embodiment receptacle 199 is disposed on the tool 53. When the tool 53 is rotated clockwise from the position shown in FIG. 3 to a second position with the distal end 55 above the receptacle 199, the debris will slide into the receptacle 199 by the force of gravity.

Figures 4, 5:
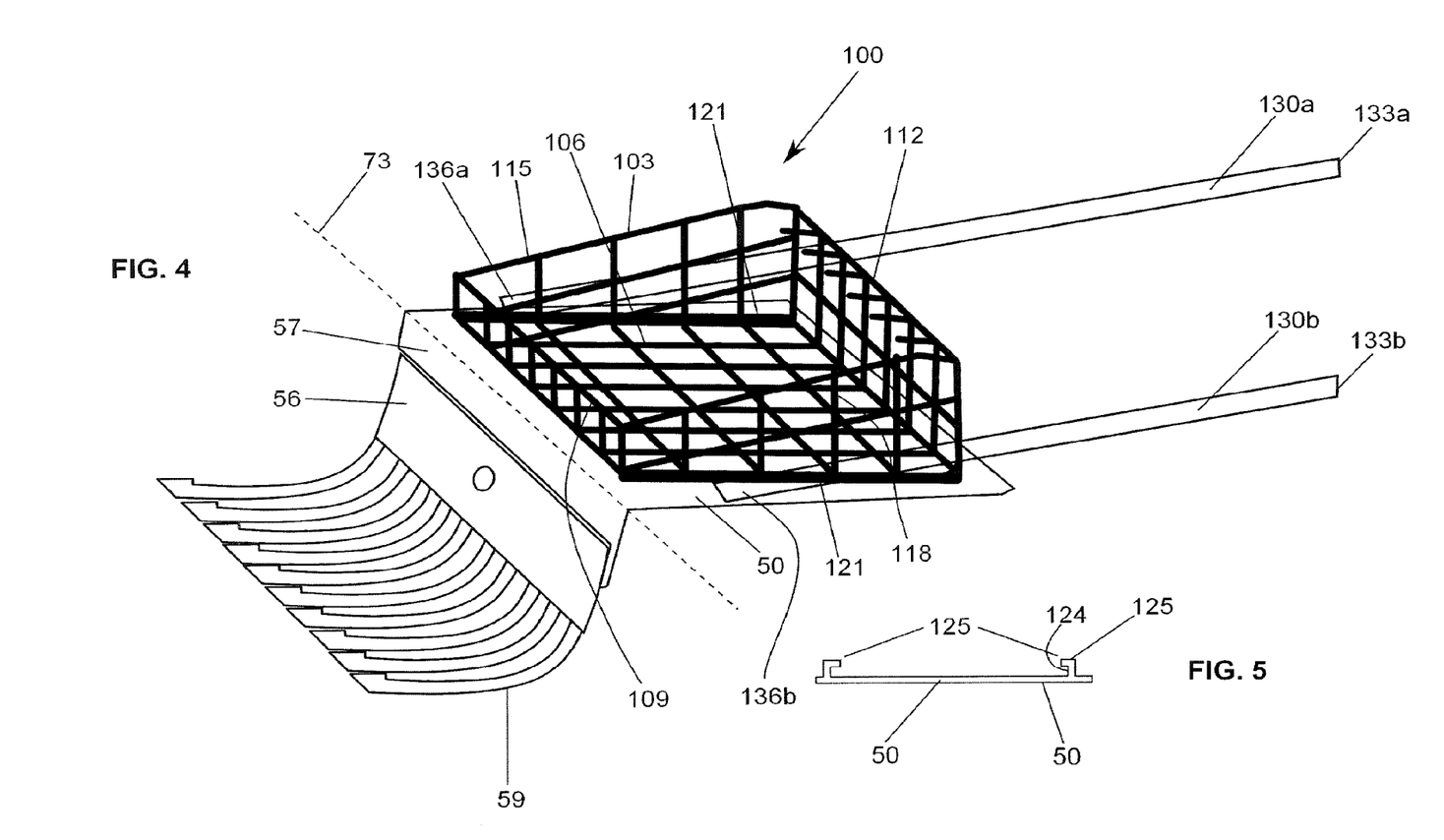
FIG. 4 is a schematic view of another embodiment of the present invention.
FIG. 5 is a front elevational view of an embodiment of a mounting plate of the present invention.

In FIG. 4, an alternate embodiment of the invention is shown. A removable basket 100 is shown. The basket 100 may be constructed of rods 103 or wire in a grid-like structure forming an open mesh configuration. The rods 103 may be formed of metal or other durable materials including plastic or the like. As shown the rods 103 are arranged perpendicular to each other and form a bottom wall 106, a front wall 109, a back wall 112 that is taller than the front wall 109, and a pair of side walls 115, 118. The height of the side walls 115, 118 may vary from the front to the back as shown. The bottom portion of the basket is provided with a flange 121. The flange 121 is sized to fit within a channel 124 formed in an upstanding member 125 at the top of the first plate 50 as shown in FIG. 5. Accordingly, the basket 100 can be slid into and out of the channel 124 to provide for removing it from the first plate 50 in order to discard debris that has been stored in the basket 100. Other structures for removably mounting the basket 100 on the first plate 50 may also be used such as hook and loop fasteners or the like.

The embodiment shown in FIG. 4 may be mounted to the mower 20 by means of a pair of tubes 130a and 130b that extend toward the second end 22. The tubes 130a, 130b may attach to the arms 38a and 38b respectively at one end 133a, 133b and attach to first plate 50 at the opposite end 136a, 136b. Alternatively, the tool 53 could be attached to the mower deck 29 in other ways. For example, tension straps may be attached at a first end to the bottom edge of the rear of the mower deck 29. The tension straps may be disposed through slots at the rear of the first plate 50 and travel through another set of slots at the front of the first plate 50. The straps may be attached at a second end opposite the first end to the bottom edge of the front of the mower deck 29. The first plate 50 could also be attached to the mower deck 29 by means of short screws that pass through the first plate 50 and into the mower deck 29. It would also be possible to attach the tool by means of hook and loop fasteners with one fastener disposed on the bottom of the first plate 50 and the other fastener disposed on the mower deck 29. Other means for fastening the first plate 50 to the mower deck 29 such as adhesives or the like may also be suitable. In order to compensate for differences in height on the front of the mower deck shims or spacers may be used.

Toward the front of FIG. 4, the tool has a set of curved tines 59 that extend down into the lawn in front of the mower 20 when the mower 20 is in operation with the tool 53 in the open position shown. The tool 53 may be adjustably attached to a second plate 57 that is pivotally attached to the first plate 50 along a pivot axis 73. The pivoting connection between the two plates 50, 57 may be established by various hinges such as, but not limited to, flag hinges, slip joint hinges, stop hinges, T-hinges or the like as will be evident to those of ordinary skill in the art based on this disclosure. It will also be evident to those of ordinary skill in the art based on this disclosure that the first plate 50 or second plate 57 may not be required. The tool 53 may be pivotally mounted directly to the first end 21 of the mower 20 on the mower deck 29 without requiring separate mounting plates.

Figure 6:
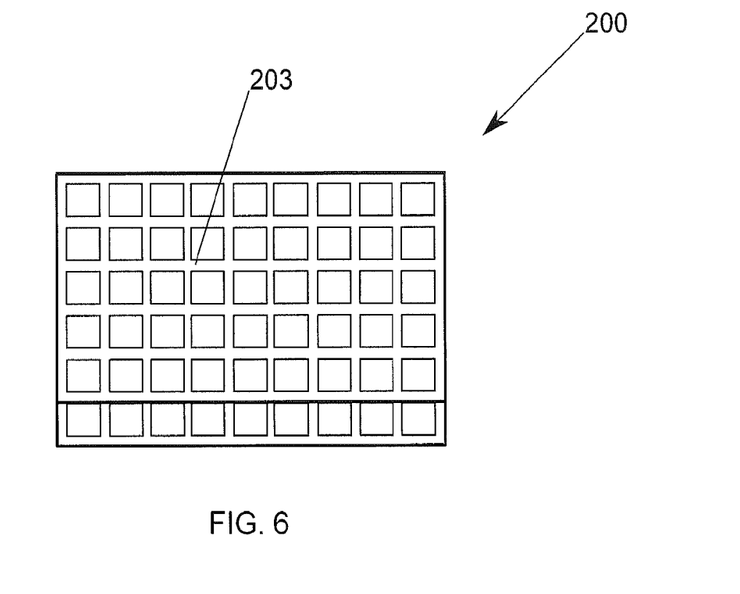
FIG. 6 is a top plan view of one embodiment of a basket of the present invention.
Figure 7:
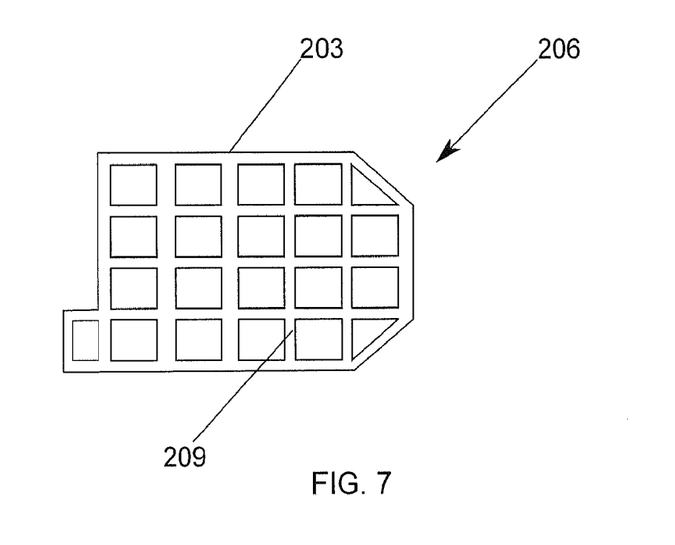
FIG. 7 is a side elevational view of the basket shown in FIG. 6.

FIGS. 6-7 illustrate an alternate embodiment with basket 200 having a top wall 203 and an angled back wall 206. The basket 200 is also formed by a grid formed out of rods 209.

Figure 8:
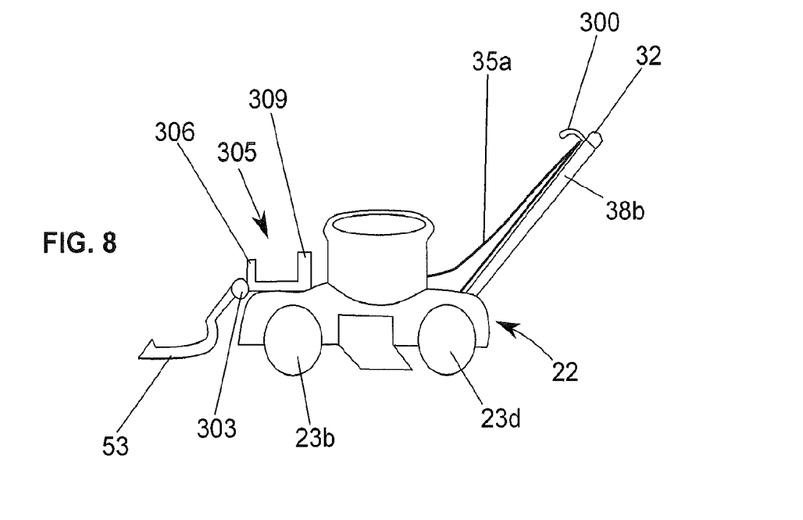
FIG. 8 is a side elevational view of another embodiment of invention installed on a walk behind mower.
Figure 9:
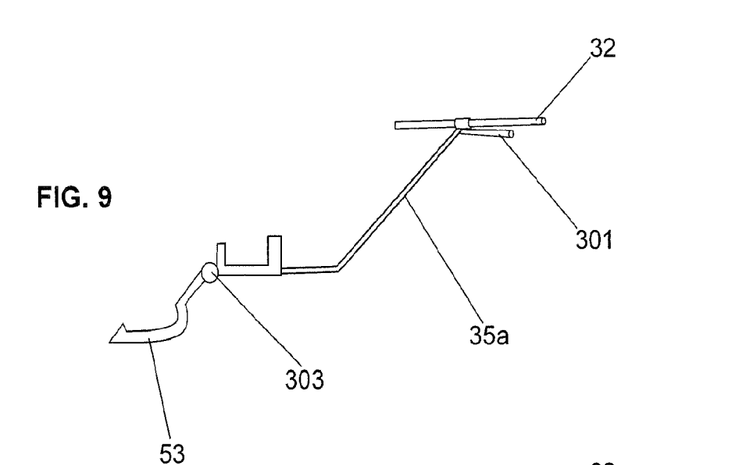
FIG. 9 is a side elevational view of an embodiment of a control system for the present invention shown in the open position.
Figure 10:
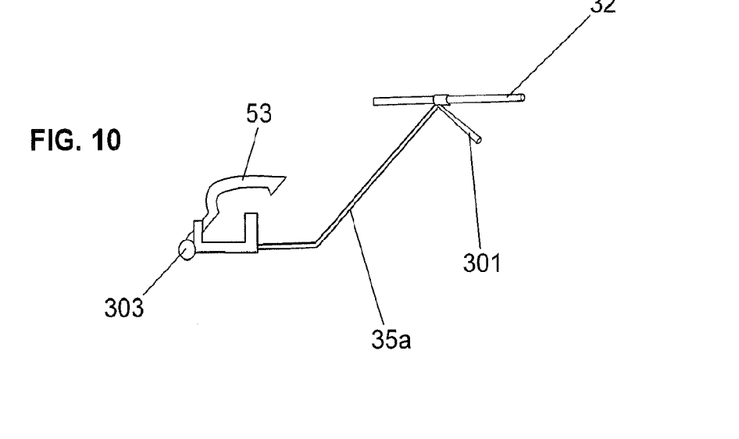
FIG. 10 is a side elevational view of the embodiment shown in FIG. 9 shown in the closed position.

FIGS. 8-10 show a control system for deploying the tool 53 remotely by means of a hand operated actuator 300, 301 that may be mounted to the handle 32 or supporting arms 38a, 38b extending from the second end 22 of the mower 20. A receptacle 305 has a first upstanding wall 306 and a second upstanding wall 309. A pivot point 303 is positioned toward the front of the mower and provides for movement of the tool 53 between the open position shown in FIGS. 8-9 and the closed position shown in FIG. 10. The pivoting of the tool 53 may be mechanically actuated by means of a wire disposed inside the cable 35a or could be electrically actuated by means of an electric control wire that may extend to a motor for rotating the tool. The system could be hard wired or operated by remote control from the actuator positioned on the handle.

Figure 11:
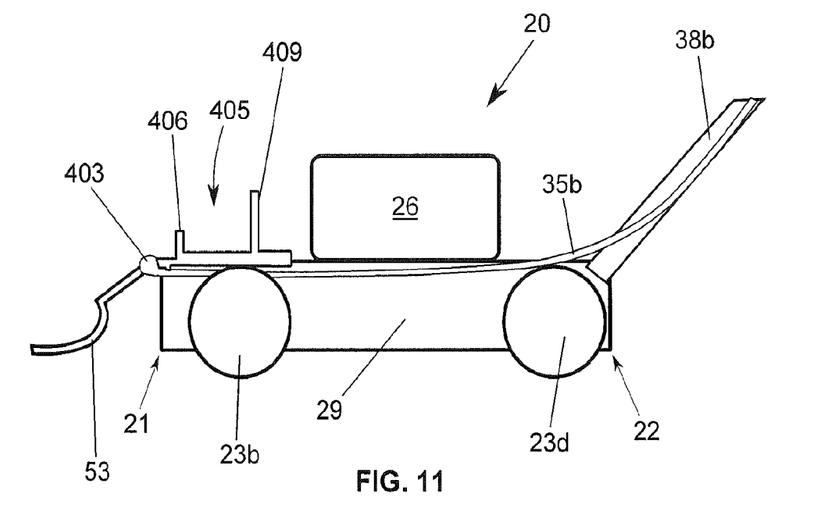
FIG. 11 is a side elevational view of another embodiment of the invention installed on a walk behind mower with the invention in the open position.
Figure 12:
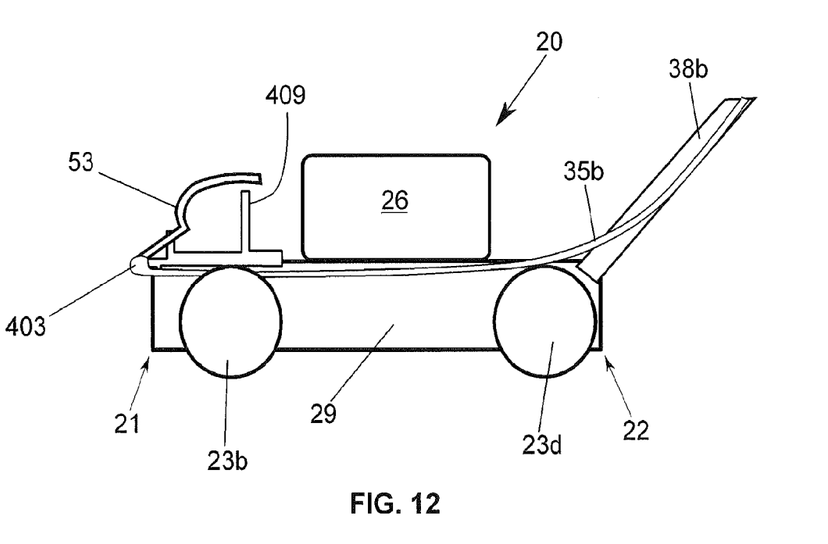
FIG. 12 is a side elevational view of the embodiment shown in FIG. 11 shown in the closed position.

FIGS. 11 and 12 show a schematic diagram of another embodiment of the present invention. The receptacle 405 has an open top with a first wall 406 and a second wall 409 that is taller than the first wall 406. When the tool 53 is deployed in the closed position it extends over the opening to provide a cover for the receptacle 405. The tool 53 pivots about pivot point 403. The pivoting may be accomplished by an electrical motor or by mechanical means such as a guide wire disposed inside cable 35b.

Figure 16:
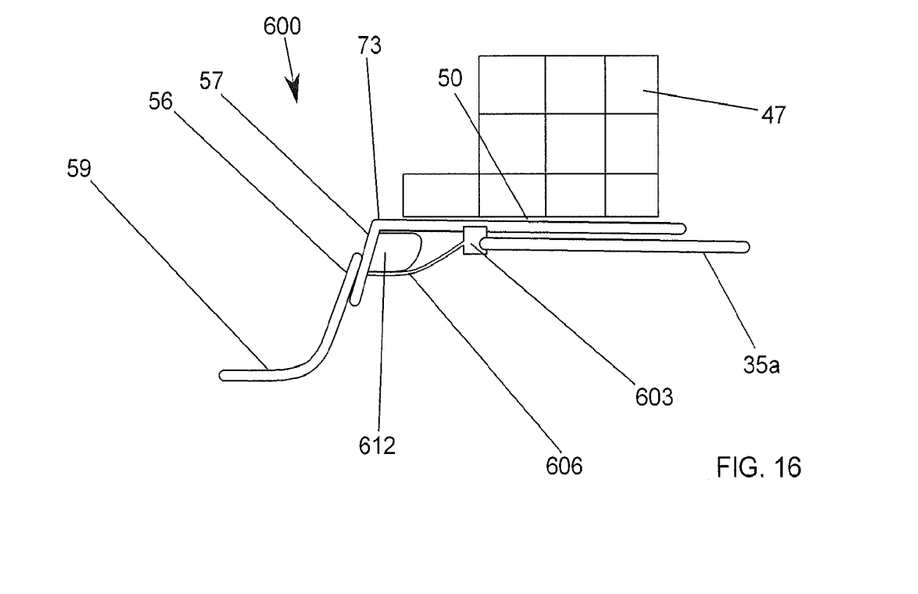
FIG. 16 is a side elevational view of an alternate embodiment of the control system in the open position; and, FIG. 17 is a side elevational view of an alternate embodiment of the control system in the closed position.
Figure 17:
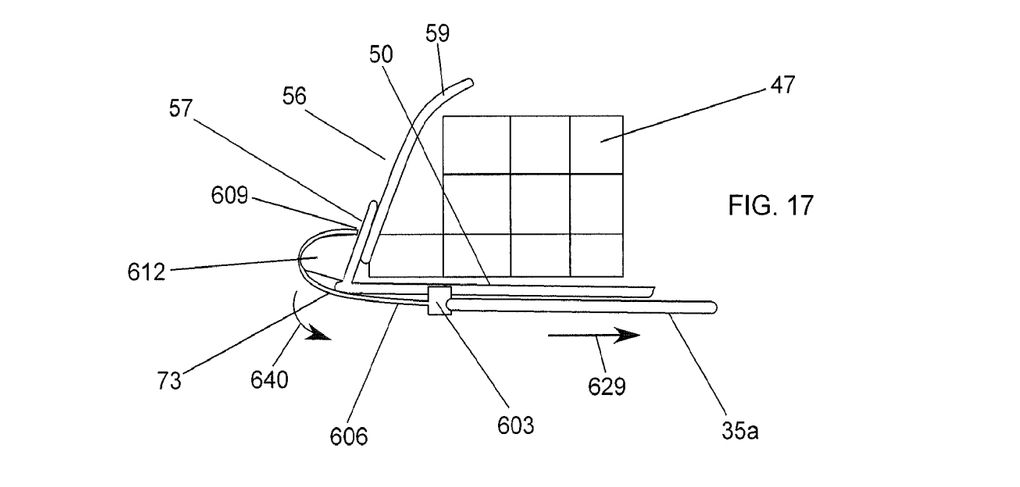

In FIGS. 16-17, an alternate control system 600 is shown. The cable 35a is supported by a cable holder 603. A flexible wire 606 is disposed inside the cable 35a and is attached to second plate 57 at a distal end 609 (best shown in FIG. 17). A guide 612 may be attached to plate 57 and provides a bearing surface for flexible wire 606. When the flexible wire 606 is released, the tool 53 pivots upward in the clockwise direction (as shown in FIG. 17) by means of the force of a biasing member such as a torsion spring 500 (FIG. 15) loaded to close or the like. When the flexible wire 606 is pulled to the right in the direction of arrow 629 with respect to the cable 35a, a force is applied to the bottom of plate 57 to cause it to rotate about pivot point 73 in the direction of arrow 640. The cable 35*a* may extend along arms 38*a* or 38*b* and extend to the actuator 70 which may be mounted on one of the arms 38*a* or 38*b* or may be mounted on the handle 32. Accordingly, the user may remotely activate the debris removal system from their position behind the mower in the case of a walk behind mower. In other types of mowers, the actuator 70 may be mounted wherever it is conveniently within reach of the operator of the equipment.

The present invention contemplates that many changes and modifications may be made. Therefore, while the presently-preferred form of the debris removal system has been shown and described, and several modifications and alternatives discussed, persons skilled in this art will readily appreciate that various additional changes and modifications may be made without departing from the spirit of the invention, as defined and differentiated by the following claims.

The invention claimed is:

1. A debris removal system mounted on a lawn mower operated by a user, the lawn mower having a first end, a second end opposite the first end, and a mower deck, the debris removal system comprising:
   a tool disposed on the mower, the tool configured to collect debris and having a proximal end and a distal end, the tool capable of being moved from a first position with the distal end extending forward from the first end of the mower into contact with the lawn to a second position where the distal end of the tool is positioned above and out of contact with the lawn;
   a receptacle configured to receive debris from the tool when the tool is moved from the first position to the second position; and,
   a control system for moving the tool between the first and second position, the control system within the reach of the user while mowing the lawn; and, wherein the control system comprises a control wire capable of causing the tool to move between the first and second position; and, wherein an actuator for moving the control wire is mounted on one of an arm and a handle attached to the second end of the mower.

2. The debris removal system of claim 1, wherein the receptacle is disposed on the mower.

3. The debris removal system of claim 1, wherein the receptacle is disposed on the tool.

4. The debris removal system of claim 1, wherein the tool is pivotally mounted to the mower.

5. A debris removal system mounted on a lawn mower operated by a user, the lawn mower having a first end, a second end opposite the first end, and a mower deck, the debris removal system comprising:
   a tool disposed on the mower, the tool configured to collect debris and having a proximal end and a distal end, the tool capable of being moved from a first position with the distal end extending forward from the first end of the mower into contact with the lawn to a second position where the distal end of the tool is positioned above and out of contact with the lawn;
   a receptacle configured to receive debris from the tool when the tool is moved from the first position to the second position; and,
   a control system for moving the tool between the first and second position, the control system within the reach of the user while mowing the lawn; and,
further comprising a first plate mounted to the mower deck and a second plate pivotally attached to the first plate.

6. The debris removal system of claim 5, wherein the first and second plate are connected by a hinge, the second plate having a biasing member causing the second plate to rotate.

7. The debris removal system of claim 5, wherein the tool is adjustably mounted on the first plate.

8. The debris removal system of claim 5, wherein the receptacle is removably attached to the mower.

9. The debris removal system of claim 5, wherein the tool has a solid substantially planar portion and a collection portion having a plurality of curved tines extending from the solid portion.

10. The debris removal system of claim 5, wherein the receptacle is formed from a wire grid.

11. The debris removal system of claim 5, wherein the control system comprises a control wire capable of causing the tool to move between the first and second position.

12. A debris removal system mounted on a lawn mower operated by a user, the lawn mower having a first end, a second end opposite the first end, and a mower deck, the debris removal system comprising:
   a tool disposed on the mower, the tool configured to collect debris and having a proximal end and a distal end, the tool capable of being moved from a first position with the distal end extending forward from the first end of the mower into contact with the lawn to a second position where the distal end of the tool is positioned above and out of contact with the lawn;
   a receptacle configured to receive debris from the tool when the tool is moved from the first position to the second position; and,
   a control system for moving the tool between the first and second position, the control system within the reach of the user while mowing the lawn; and,
wherein the control system comprises a control wire capable of causing the tool to move between the first and second position; and, wherein an actuator for moving the control wire is mounted on one of an arm and a handle attached to the second end of the mower.

13. A debris removal system mounted on a lawn mower operated by a user, the lawn mower having a first end, a second end opposite the first end, and a mower deck, the debris removal system comprising:
   a tool configured to collect debris and pivotally mounted to the first end of the mower, the tool having a proximal end and a distal end, the tool capable of being rotated between a first position with the distal end extending forward from the first end of the mower into contact with the lawn and a second position where the distal end of the tool is positioned above and out of contact with the lawn;
   a receptacle configured to receive the debris from the tool when the tool is rotated from the first position to the second position;
   wherein a control system causes the tool to move between the first position and the second position, the control system disposed within the reach of the user while mowing the lawn; and, wherein the control system comprises a control wire capable of causing the tool to move between the first and second position; and, wherein an actuator for moving the control wire is mounted on one of an arm and a handle attached to the second end of the mower.

14. The debris removal system of claim 13, wherein the tool is biased in the second position by a biasing member.

15. The debris removal system of claim 14, wherein the control system comprises a flexible wire attached to the tool such that movement of the wire in a first direction causes the tool to rotate from the second position to the first position against the force of the biasing member.

16. The debris removal system of claim 13, wherein the receptacle is disposed on the tool.

17. The debris removal system of claim 13, wherein the tool has a solid portion extending to a plurality of curved tines.

18. A debris removal system mounted on a lawn mower, the lawn mower having a first end, a second end opposite the first end, and a mower deck, the debris removal system comprising:
- a tool configured to collect debris and having a proximal end and a distal end;
- means for moving the tool between a first position with the distal end extending forward from the first end of the mower into contact with the lawn to a second position where the distal end of the tool is positioned above and out of contact with the lawn;
- means for collecting debris disposed on the tool when the tool is moved from the first position to the second position; and,
- means for remotely actuating the means for moving; and, wherein the means for remotely actuating comprises a control wire capable of causing the tool to move between the first and second position; and, wherein an actuator for moving the control wire is mounted on one of an arm and a handle attached to the second end of the mower.

19. A lawn mower operated by a user, comprising:
- a mower deck having a first end and a second end and a rotating blade mounted thereto;
- a plurality of wheels supporting the mower deck;
- a motor mounted above the mower deck for providing power to the rotating blade;
- a tool configured to collect debris and pivotally mounted to the first end of the mower deck, the tool having a proximal end and a distal end, the tool capable of being rotated between a first position with the distal end extending forward from the first end of the mower deck into contact with the lawn and a second position where the distal end of the tool is positioned above and out of contact with the lawn;
- a receptacle configured to receive the debris from the tool when the tool is rotated from the first position to the second position;

wherein a control system causes the tool to move between the first position and the second position, the control system disposed within the reach of the user while mowing the lawn; and, wherein the control system comprises a control wire capable of causing the tool to move between the first and second position; and, wherein an actuator for moving the control wire is mounted on one of an arm and a handle attached to the second end of the mower.

* * * * *